US012578949B2

(12) United States Patent　　　　(10) Patent No.:　US 12,578,949 B2

Marx et al.　　　　　　　　　　　　(45) Date of Patent:　Mar. 17, 2026

(54) DEVICE AND METHOD FOR EXCHANGING A PUBLIC KEY IN THE COURSE OF A FIRMWARE UPDATE FOR LEVEL SENSORS

(71) Applicant: VEGA GRIESHABER KG, Wolfach (DE)

(72) Inventors: Christian Marx, Altensteig (DE); André Wendling, Melsheim (FR); Martin Gaiser, Alpirsbach (DE)

(73) Assignee: VEGA GRIESHABER KG, Wolfach (DE)

( * ) Notice: Subject to any disclaimer, the term of this patent is extended or adjusted under 35 U.S.C. 154(b) by 243 days.

(21) Appl. No.: 18/174,381

(22) Filed: Feb. 24, 2023

(65) Prior Publication Data

US 2023/0273788 A1　　　Aug. 31, 2023

(30) Foreign Application Priority Data

Feb. 25, 2022　　(EP) ..................................... 22158914

(51) Int. Cl.
　　*G06F 8/65*　　　　　(2018.01)
　　*H04L 9/30*　　　　　(2006.01)
　　*H04L 9/32*　　　　　(2006.01)

(52) U.S. Cl.
　　CPC .............. *G06F 8/65* (2013.01); *H04L 9/3066* (2013.01); *H04L 9/3247* (2013.01)

(58) Field of Classification Search
　　CPC .......... G06F 8/65; G06F 21/572; G06F 21/44; H04L 9/3066; H04L 9/3247; H04L 63/06; H04L 9/3268; H04L 9/0891; H04L 9/3263
　　See application file for complete search history.

(56) References Cited

U.S. PATENT DOCUMENTS

| | | | | |
|---|---|---|---|---|
| 6,707,914 | B1 * | 3/2004 | Bell | .......................... H04L 9/12 |
| | | | | 380/46 |
| 6,782,103 | B1 * | 8/2004 | Arthan | .................. H04L 9/0891 |
| | | | | 380/278 |
| 6,976,163 | B1 * | 12/2005 | Hind | ..................... G06F 21/335 |
| | | | | 713/1 |
| 10,402,190 | B2 | 9/2019 | Haase et al. | |
| 11,210,079 | B2 * | 12/2021 | Fassino | ................. H04L 63/123 |
| 11,714,633 | B2 * | 8/2023 | Fassino | ................. H04L 9/0891 |
| | | | | 713/158 |
| 12,101,407 | B1 * | 9/2024 | Xu | ......................... H04L 9/3213 |

(Continued)

FOREIGN PATENT DOCUMENTS

| | | | | | |
|---|---|---|---|---|---|
| CN | 106663174 | A | * | 5/2017 | .............. H04W 4/60 |
| DE | 10 2017 111 928 | A1 | | 12/2018 | |

(Continued)

OTHER PUBLICATIONS

Extended European Search Report issued on Aug. 1, 2022 in European Patent Application No. 22158914.6, 7 pages.

*Primary Examiner* — Daxin Wu

(74) *Attorney, Agent, or Firm* — Oblon, McClelland, Maier & Neustadt, L.L.P.

(57)　　　　　　ABSTRACT

A device for exchanging a public key in the course of a firmware update in a level sensor, the device including signing circuitry that generates a manifest comprising a public key and to sign the public key stored in the manifest, and updating circuitry that replaces a pre-installed public key of a previous manifest in the level-measuring device with the signed public key.

16 Claims, 3 Drawing Sheets

Level measuring device

Buffer memory

Program memory (active firmwares)

Firmware 1 new

Firmware 2 new

Firmware N new

Signed manifest new, optionally with changed public key

Firmware X

Signature verification module calcultes

Hash values uses public key from

Active signed manifest, e.g. pre-installed

Verifies signature and compares hash values with calculated hash values

(56) References Cited

U.S. PATENT DOCUMENTS

| | | | |
|---|---|---|---|
| 2003/0028766 A1* | 2/2003 | Gass | G06F 21/572 |
| | | | 713/193 |
| 2003/0061484 A1* | 3/2003 | Noble | H04L 63/126 |
| | | | 713/168 |
| 2007/0055881 A1* | 3/2007 | Fuchs | H04L 9/3263 |
| | | | 713/175 |
| 2012/0110333 A1* | 5/2012 | Lukkarila | G06F 21/51 |
| | | | 713/193 |
| 2014/0019766 A1* | 1/2014 | Takahashi | H04L 9/3231 |
| | | | 713/176 |
| 2017/0279620 A1* | 9/2017 | Kravitz | H04L 63/0876 |
| 2018/0343122 A1* | 11/2018 | Spacek | H04L 9/3247 |
| 2018/0349127 A1* | 12/2018 | Haase | G06F 8/654 |
| 2019/0074982 A1* | 3/2019 | Hughes | H04L 9/0863 |
| 2019/0163465 A1* | 5/2019 | Fassino | G06F 21/64 |
| 2020/0119915 A1* | 4/2020 | Yan | H04L 9/0897 |
| 2020/0366506 A1* | 11/2020 | Brockhaus | H04L 9/3268 |
| 2021/0397441 A1* | 12/2021 | He | G06F 21/64 |
| 2022/0086001 A1* | 3/2022 | Rahn | H04L 9/3234 |
| 2022/0121749 A1* | 4/2022 | Liu | H04L 9/3239 |
| 2022/0179640 A1* | 6/2022 | Fassino | H04L 63/123 |
| 2022/0283796 A1* | 9/2022 | McFarland, Jr. | H04W 4/44 |

FOREIGN PATENT DOCUMENTS

| | | | | |
|---|---|---|---|---|
| DE | 10 2018 217 431 A1 | 4/2020 | | |
| GB | 2583798 A | * 11/2020 | | H04L 63/04 |
| JP | 2011003100 A | * 1/2011 | | |

* cited by examiner

S1

S2

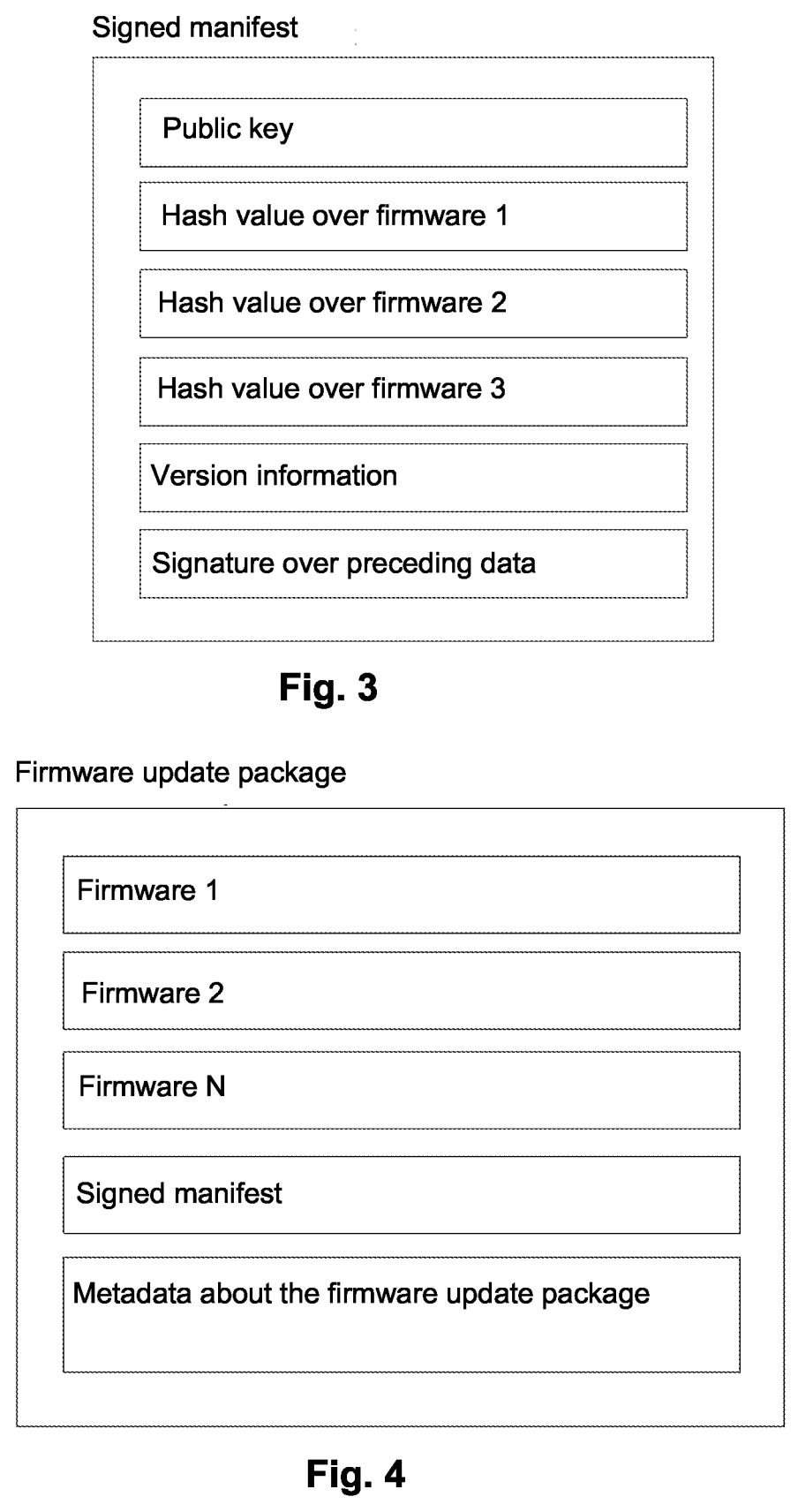

Signed manifest

| Public key |
| --- |

| Hash value over firmware 1 |
| --- |

| Hash value over firmware 2 |
| --- |

| Hash value over firmware 3 |
| --- |

| Version information |
| --- |

| Signature over preceding data |
| --- |

Fig. 3

Firmware update package

| Firmware 1 |
| --- |

| Firmware 2 |
| --- |

| Firmware N |
| --- |

| Signed manifest |
| --- |

| Metadata about the firmware update package |
| --- |

Fig. 4

Level measuring device

Verifies signature and compares hash values with
calculated hash values

Level measuring device

DEVICE AND METHOD FOR EXCHANGING A PUBLIC KEY IN THE COURSE OF A FIRMWARE UPDATE FOR LEVEL SENSORS

CROSS-REFERENCE TO RELATED APPLICATIONS

This application claims the benefit of the filing date of European Patent Application No. 22 158 914.6 filed on 25 Feb. 2022, the entire content of which is incorporated herein by reference.

FIELD

The disclosure relates to a device for exchanging a public key in the course of a firmware update in level sensors. Furthermore, the present disclosure relates to a method for exchanging a public key in the course of a firmware update in level sensors as well as a corresponding program element and a corresponding computer-readable storage medium.

BACKGROUND

DE 102017111928 A describes a method for the authorized update of a field device of automation technology.

In order for a level-measuring device to confirm the trustworthy origin of the firmware to be programmed as part of a firmware update, the level-measuring device checks a digital signature of the firmware to be programmed.

This digital signature can only be created by the manufacturer of the level-measuring device. By checking the signature within the level-measuring device, the trustworthy origin of the firmware can be confirmed beyond doubt. For the signature verification procedure, certain information must be stored persistently in the level-measuring device, for example a public key.

The manufacturer has a private key for creating the signature, which it keeps secret. Various signing algorithms can be used to create the digital signature, such as elliptical curve methods. What these methods have in common is that a hash value, for example a SHA-256, is first calculated over the binary data of the area to be protected.

The calculated hash value serves as the input value for the signing algorithm, which derives a signature from it. This can be verified using the associated public key.

In the event that the private key is compromised, that is, if third parties gain knowledge of the private key, they can create trusted firmware packages on behalf of the original manufacturer. If this happens, the manufacturer must generate a new key pair.

In future, the manufacturer will then sign all firmware update packages with the private key of the new key pair. In order for these firmware update packages to be confirmed as trustworthy by existing level measuring devices, the persistently stored public key must be replaced in these devices as part of the firmware update.

Apart from the compromise of the private key, there may also be other reasons for replacing the public key in the device, for example because they only have a limited period of validity. The requirement now arises as to how the public key can be transferred to the level measuring device in a secure manner, i.e., only after its trustworthy origin has been confirmed beyond doubt.

Disadvantageous state of the art: In the simplest case, the public key is stored directly in the program memory of the firmware. To exchange the public key, a new firmware must be created that contains the new public key.

This firmware is then signed using the existing private key to mark it as trustworthy as before. Once the firmware has been updated, the new public key is contained in the level-measuring device and can be used in the future to confirm the trusted origin of firmware update packages that have been signed with the associated new private key. Since the firmware with the new public key typically also contains the measurement application, or at least other software parts relevant for the device function, firmware updates are not welcome by some system operators.

SUMMARY

It is an object of the present embodiments to provide an improved device for exchanging a public key in the course of a firmware update in a level sensor.

A task of the present embodiments is to carry out the exchange of the public key as part of a firmware update without having to exchange the existing firmware with the measuring application of the level measuring device or other device functions. It is also ensured that the public key is only exchanged if its doubtless origin could be confirmed.

This task is solved by the features of the independent patent claims. Further embodiments result from the dependent claims and the following description of embodiments.

The public key to be implemented in the device is not stored in the firmware for this purpose, but represents an independent binary, the so-called manifest, of the firmware update package.

To confirm the trusted origin of the manifest, it is signed with the manufacturer's private key. Advantageously, the manifest also contains the hash value about the binary of the firmware in addition to the public key, so that the trusted origin of the public key and the trusted origin of the firmware are ensured at the same time.

Optionally, the manifest can still contain hash values of other firmware parts. In addition, other metadata of the level measuring device can optionally be included, for example version numbers that identify the overall system or individual parts of the system.

For example, the firmware update package may include the following items:

Firmware binary file

Optionally, additional binary files with firmware parts, e.g., for systems with multiple microprocessors Binary file of the signed manifest File containing fill, e.g., destination addresses, lengths, checksums of the various binaries The signed manifest of the firmware update package may look like the following:

Public Key

Hash value, calculated over the firmware binary data

Optional additional hash values, calculated over binary data of additional firmware parts Optional metadata about the firmware parts of the firmware update package, e.g., version information Signature, calculated over the hash value of the binary data of the manifest As part of a firmware update, an update client, for example a PC program or a mobile app, transmits certain binary files and metadata of the firmware update package to the level measuring device via a communication channel according to a rule to be specified.

The regulation can specify, for example, that a binary file is only transferred to the level measuring device if the respective associated firmware part in the level measuring device is different.

For the comparison of a firmware part with the associated binary file of the firmware update package, for example, a comparison of version numbers or a comparison of hash values can be performed over the respective binary data.

The level measuring device does not save the received components of the firmware update package directly in the program memory, but stores them in a buffer memory.

After all components have been received, the level measuring device checks the signature of the received signed manifest. The public key required for this signature check is stored by the manufacturer during the manufacturing process in a defined memory area, outside other firmware parts, in the form of a pre-installed signed manifest.

The part of the firmware responsible for signature verification accesses the public key of this signed manifest to verify the signature of the signed manifest of the firmware update package. After successful signature verification, the level-measuring device checks the validity of all hash values of the manifest by calculating the hash values across all firmware parts or by tasking other firmware parts to calculate the hash values and comparing the calculated hash values with the corresponding hash values in the received signed manifest.

If all pairs of hash values match, the trusted origin of the firmware update package is considered confirmed and the level measuring device will install the received firmware parts in the associated program memories or instruct other firmware parts to install the received firmware parts.

The verified signed manifest of the firmware update package is copied by the level measuring device to the location of the pre-installed signed manifest and replaces it. In this way, the verified signed manifest of the firmware update package is used for signature verification of firmware update packages in the future. A public key swap is thus performed simply by placing a new public key in the signed manifest (with the existing private key) of a firmware update package.

Instead of a public key, a digital certificate, for example in X.509 format, can be used in the preinstalled signed manifest and in the signed manifest of the firmware update package. This can be self-signed or signed by a certificate authority.

The present embodiments allow that the public key to be used for signature verification is not part of the firmware or a firmware part, but is present as a pre-installed signed manifest in an independent memory area.

In this way, a new signed manifest can be transferred to the level-measuring device as part of a firmware update in a transparent manner—like binaries of an ordinary firmware part—and take the place of the pre-installed signed manifest after successful verification, providing a simple and efficient mechanism to exchange the active public key of the level-measuring device.

If a firmware update package does not contain any other firmware parts besides the binary file of the signed manifest, this type of key exchange can guarantee that no functional components of the level measuring device are changed.

A first aspect of the embodiments relates to a device for exchanging a public key in the course of a firmware update in a level sensor, the device comprising: signing means configured to generate a manifest comprising a public key and to sign the public key stored in the manifest.

Furthermore, the device comprises an updating means configured to replace a pre-installed public key of a previous manifest in the level-measuring device with the signed public key.

According to an embodiment, it is provided that the signing means is configured to use as signing algorithm an elliptic curve cryptography signing algorithm, preferably or for example the signing algorithm secp256k1, secp256r1, sepc384, or sect571.

According to an embodiment, it is provided that the signing means is configured to form and generate a manifest, the manifest preferably comprising a first firmware part with security-oriented functions, particularly preferably measurement application, and further the manifest comprising a second firmware part with non-security-oriented functions.

In addition to the public key, the manifest may contain the hash value over the binary data of a firmware part with security-oriented functions and the hash value over the binary data of a second firmware part.

The entire manifest is then signed—this ensures the trusted origin of the firmware parts and the public key. This does not necessarily have to be the measurement application or the non-security relevant functions.

According to an embodiment, it is provided that the updating means is configured to distribute the manifest to different microprocessors of the level sensor.

According to an embodiment, the signing means is configured to generate the manifest comprising the public key as a binary description, wherein the public key is embedded, for example, as an ASN.1 structure in DER format.

According to an embodiment, it is provided that the device is configured for field devices.

Another aspect of the present embodiments relates to a method for exchanging a public key in the course of a firmware update in a level sensor.

As a first step of the method, a manifest comprising a public key is generated and the public key stored in the manifest is signed.

As a second step of the method, a pre-installed public key of a previous manifest is replaced in the level-measuring device with the signed public key.

According to an embodiment, the signature of the signed public key is first checked and the pre-installed public key is only replaced after successful checking.

At this point, it should be noted that according to a further aspect of the embodiments, the features described above and below with respect to the field device or the device can also be implemented as method steps.

Likewise, the method steps described above and below may be implemented by certain embodiments of the field device or the device.

According to another aspect of the embodiments, a program element is disclosed that, when executed on a processor of the field device or device, instructs the field device or device to perform the steps described above and below.

According to a further embodiment, there is disclosed a computer-readable medium on which a program element described above is stored.

The program element may be part of software stored on a processor. Furthermore, this embodiment comprises a program element, which is subject to the method or individual method steps described above and below.

According to another embodiment, the device may also be realized as a distributed system or distributed computing environment.

In the following, further embodiments are described with reference to the figures. If the same reference signs are used in the following description of figures, these designate the same or similar elements. The representations in the figures are schematic and not to scale.

BRIEF DESCRIPTION OF THE FIGURES

FIG. 3 shows a layout of the signed manifest according to an embodiment.

FIG. 4 shows a layout of the firmware update package according to an embodiment.

DETAILED DESCRIPTION OF EMBODIMENTS

The illustrations in the figures are schematic and not to scale.

If the same reference signs are used in different figures in the following figure description, these designate the same or similar elements. However, identical or similar elements can also be designated by different reference signs.

Figures 1, 2:
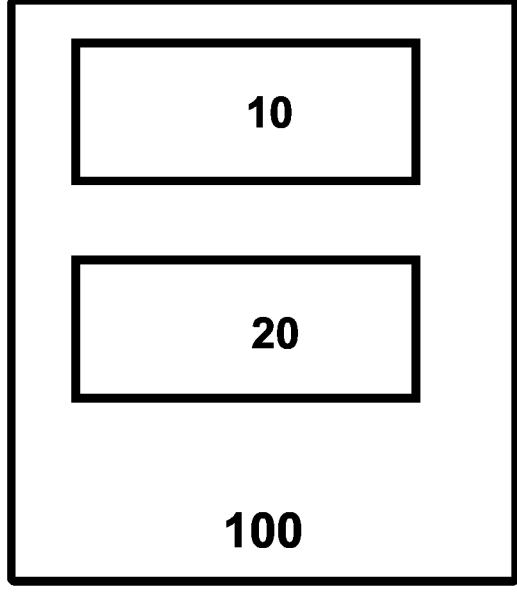
FIG. 1 shows a device for exchanging a public key in the course of a firmware update in a level sensor according to an embodiment.
FIG. 2 shows a flowchart of a method for exchanging a public key in the course of a firmware update in a level sensor according to an embodiment.

FIG. 1 shows a device for exchanging a public key in the course of a firmware update in a level sensor according to an embodiment.

A device 100 for exchanging a public key in the course of a firmware update in a level sensor comprises a signing means 10 and an updating means 20.

The signing means 10 is configured to generate a manifest comprising a public key and to sign the public key stored in the manifest; and the updating means 20 is configured to replace a preloaded public key of a previous manifest in the level measuring device with the signed public key.

FIG. 2 shows a flowchart of a method for exchanging a public key in the course of a firmware update in a level sensor according to an embodiment.

As a first step of the method, generating S1 a manifest comprising a public key and signing the public key stored in the manifest.

As a second step of the method, replacing S2 an already pre-installed public key of a previous manifest in the level-measuring device with the signed public key.

According to an embodiment, the signature of the signed public key is first checked and the pre-installed public key is only replaced after successful checking.

FIG. 3 shows a layout of the signed manifest according to an embodiment.

FIG. 4 shows a layout of the firmware update package according to an embodiment.

Figure 5:
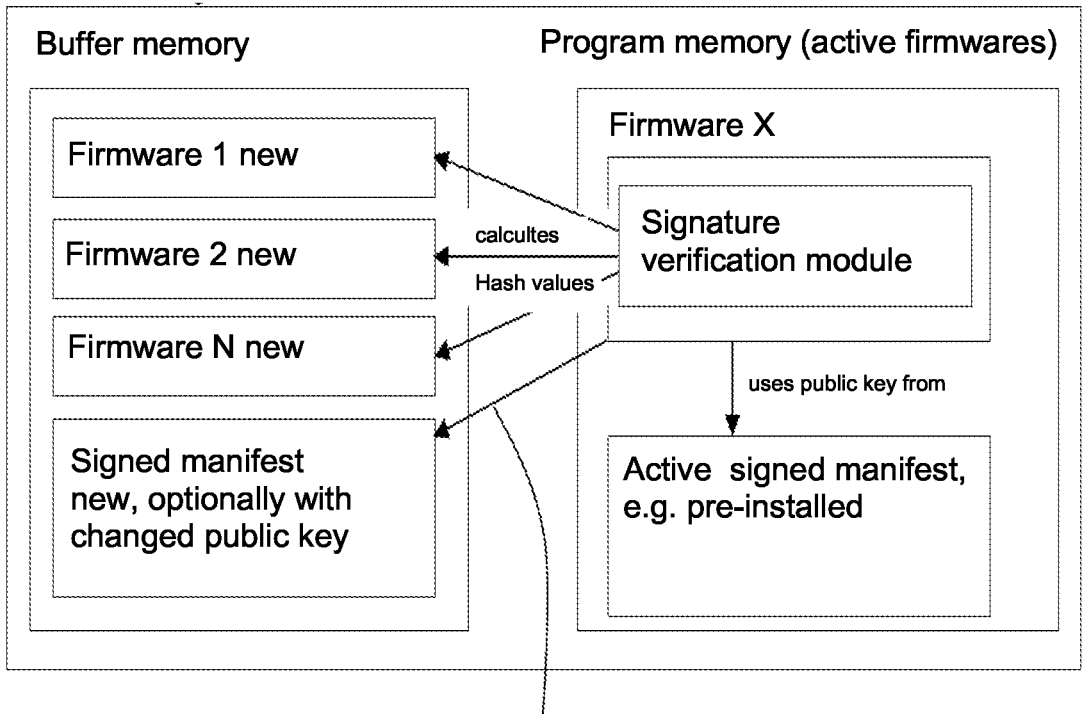
FIG. 5 shows a flowchart of a signature verification according to an embodiment.

FIG. 5 shows a flowchart of a signature verification according to an embodiment.

Figure 6:
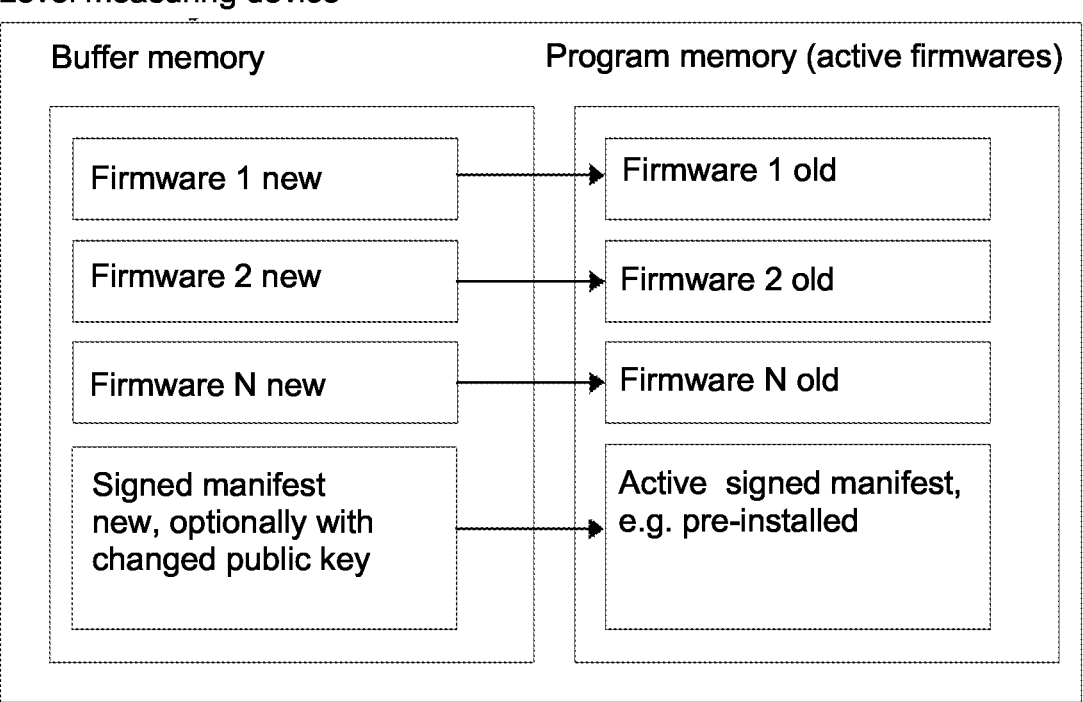
FIG. 6 shows a flowchart of an exchange of firmwares and signed manifest as part of a firmware update in accordance with an embodiment.

FIG. 6 shows a flowchart of an exchange of firmware files and signed manifest as part of a firmware update according to an embodiment.

Additionally, it should be noted that "comprising" and "comprising" do not exclude other elements or steps, and the indefinite articles "one" or "a" do not exclude a plurality.

It should further be noted that features or steps that have been described with reference to any of the above embodiments may also be used in combination with other features or steps of other embodiments described above. Reference signs in the claims are not to be regarded as limitations.

The invention claimed is:

1. A device for exchanging a public key in a course of a firmware update in a level sensor, said device comprising:
   signing circuitry configured to generate a new manifest including a public key and to sign the public key stored in the new manifest with an existing private key; and
   updating circuitry configured to replace a preloaded public key of a previous manifest in the level sensor with the signed public key of the new manifest, wherein the preloaded public key and the existing private key form a key pair,
   wherein the device is configured, before replacing the preloaded public key of the previous manifest in the level sensor with the signed public key of the new manifest, to check a signature of the signed public key using the preloaded public key according to the key pair to perform the check and replace the preloaded public key after successful checking.

2. The device according to claim 1, wherein the signing circuitry is further configured to use, as a signing algorithm, an elliptic curve cryptography signing algorithm.

3. The device according to claim 1, wherein the signing circuitry is further configured to generate a manifest including a first firmware part with security-oriented functions and a second firmware part with non-security-oriented functions.

4. The device according to claim 1, wherein the updating circuitry is further configured to distribute the new manifest to different microprocessors of the level sensor.

5. The device according to claim 1, wherein the signing circuitry is further configured to generate the new manifest comprising the public key as a binary description, wherein the public key is embedded as an ASN.1 structure in DER format.

6. The device according to claim 1, wherein the device is configured for field devices.

7. A field device comprising:
   the device for exchanging the public key in the course of the firmware update in the level sensor according to claim 1.

8. A computer network segment comprising:
   a plurality of devices according to claim 1.

9. A method for exchanging a public key in a course of a firmware update in a level sensor, the method comprising:
   generating a new manifest having a public key and signing the public key stored in the new manifest with an existing private key; and
   replacing an already preloaded public key of a previous manifest in the level sensor with the signed public key of the new manifest, wherein the preloaded public key and the existing private key form a key pair,
   wherein before the replacing, a signature of the signed public key of the new manifest is further verified using the preloaded public key according to the key pair to perform verification and, after successful verification, the replacement of the already preloaded public key takes place.

10. A non-transitory computer readable medium having stored thereon a program including instructions, which, when the program is executed by a computer, causes the computer to implement the method according to claim 9.

11. The device according to claim 2, wherein the signing circuitry is further configured to use, as the signing algorithm, secp256k1, secp256r1, sepc384, or sect571.

12. The device according to claim 3, wherein the first firmware part includes a measurement application.

13. The device according to claim 2, wherein the signing circuitry is further configured to generate a manifest including a first firmware part with security-oriented functions and a second firmware part with non-security-oriented functions.

14. The device according to claim 2, wherein the updating circuitry is further configured to distribute the new manifest to different microprocessors of the level sensor.

15. The device according to claim 3, wherein the updating circuitry is further configured to distribute the new manifest to different microprocessors of the level sensor.

16. The device according to claim 1, wherein the signing circuitry is further configured to generate the new manifest comprising the public key as a binary description, wherein the public key is embedded.

\* \* \* \* \*